Patented Jan. 8, 1952

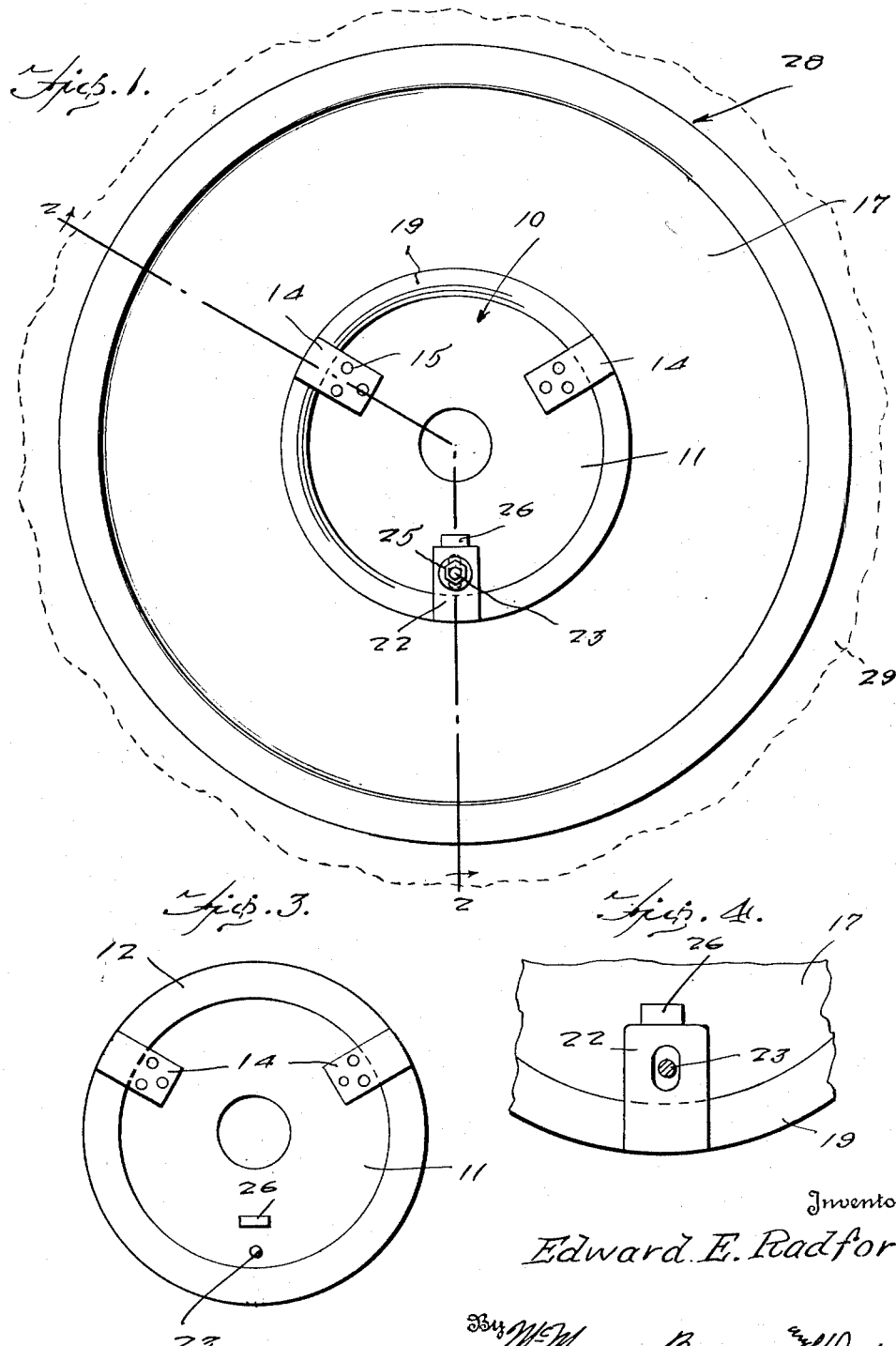

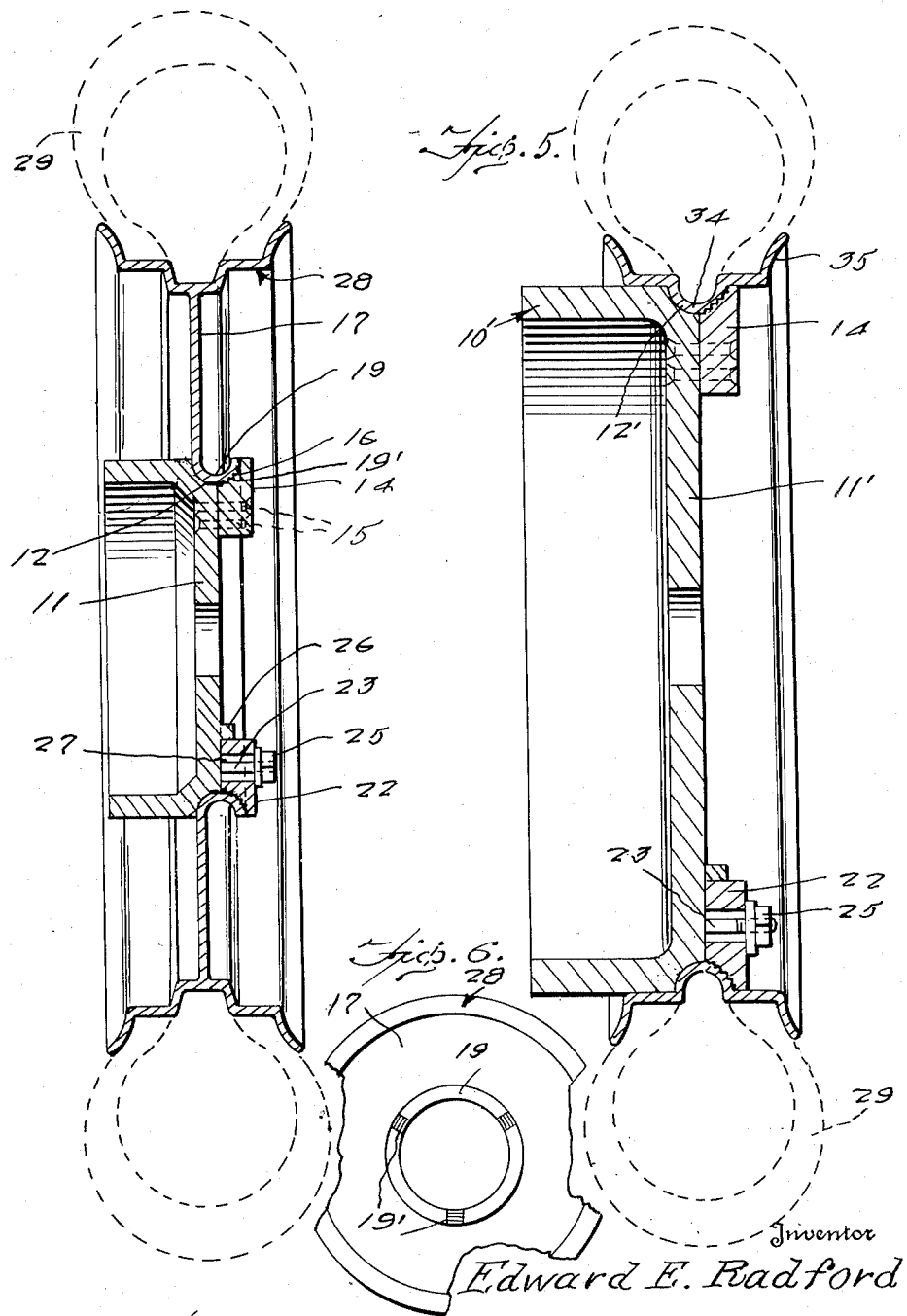

2,581,554

UNITED STATES PATENT OFFICE 2,581,554

DEMOUNTABLE WHEEL

Edward E. Radford, San Francisco, Calif.

Application November 19, 1946, Serial No. 710,810

2 Claims. (Cl. 301—24)

This invention relates to demountable rims or wheels for rubber-tired vehicles.

It is an object of the present invention to simplify the present-day construction of demountable rims and wheels for rubber-tired vehicles.

It is another object of the invention to provide a sturdy and simple means for effecting the attachment of the tire rim or wheel to the wheel hub or brake band which will employ but a single clamp-fastener device which will need to be tightened upon attachment of the wheel or rim to the wheel hub or drum to finally secure the wheel or rim thereto.

According to the invention there are three fastening clips distributed on the wheel hub or brake drum, two of which are rigidly fixed thereto and are grooved at their top edges to receive an arcuate shaped internal peripheral flange of a wheel or rim being attached to the wheel hub or drum, and the third of which is detachable to a stud at an intermediate point on the wheel hub or rim. The clamping element fitted over the stud has an elongated slot so that it can be slid downwardly or upwardly over the stud and thereby to facilitate the withdrawal of the rim or wheel from the hub without the total removal of the clamping nut.

For a better understanding of the invention, reference may be had to the following detailed description taken in connection with the accompanying drawing, in which Figure 1 is an outboard side elevation of a wheel rim which has been attached to a wheel hub by the means provided by the present invention.

Figure 2 is an enlarged transverse vertical sectional view taken along the line 2—2 of Figure 1 and looking in the direction of the arrows thereof.

Figure 3 is an outboard side elevation of a wheel hub or brake drum to which a rim is connected by means of the retaining elements of the present invention.

Figure 4 is a fragmentary detail view looking upon the detachable element in place upon the wheel hub or drum.

Figure 5 is an enlarged transverse vertical sectional view of a brake drum of large diameter with the demountable rim attached thereto.

Figure 6 is an outboard side elevation of the tire rim free of the hub of the form of the invention shown in Figures 1 to 4.

Referring now to the drawings, 10 represents a wheel hub or brake drum having the web 11 on its outboard end. The peripheral edge of the web 11 is formed with a concave quarter-circular half-groove 12. On the outboard side of the web portion 11 there are secured permanently, clamp elements 14 as by means of rivets 15 and arranged 120 degrees apart. The clamp elements 14 have serrated concave half-grooves 16 cooperating with the half-grooves 12 to provide a groove of semi-circular cross section. Into these grooves are adapted to be conformably seated the laterally outwardly bent flange 19 on the inner peripheral edge of a wheel disk 17, the flange 19 having serrations 19' for complementary engagement with the serrated surfaces of the half-grooves 16 of the clamp elements 14. The flange 19 is of arcuate cross section to conform to the half-grooves 12 and the half-grooves 16.

After the wheel is in place upon the fixed clamping elements 14, it is dropped over a loosened clamping element or plate 22 carried on a stud 23 and secured to the wheel hub by a washer 24 and a nut 25. By having the nut 25 sufficiently loose, the clamping element or plate 22 can be withdrawn so as to drop down below an integral retaining lug 26 on the drum web 11. An elongated slot 27 in the clamping element 22 permits the withdrawal of the element 22, the stud 23 being extended through the elongated slot 27. When the wheel is finally in place upon the hub or brake drum 10, the clamping element 22 is raised upwardly into place over the inner peripheral flange 19 of the wheel disk 17 so that it will be supported against inward displacement by the lug 26 and against rotation about the axis of the stud. The wheel disk 17 includes an integral tire rim 28 with a tire 29 thereon.

Referring now to Figure 5, there is shown a similar arrangement where the rim is disposed directly upon a brake drum 10' of large diameter. This brake drum has a web portion 11' in the peripheral edge of which there is provided a concave half-groove 12' adapted to receive an annular projection 34 of semi-circular section of a tire rim 35. This drum 10' has riveted thereto the clamping elements 14 arranged 120 degrees apart upon the face portion 11'. Also there is provided on this face portion the detachable clamping element 22 which is fixed and secured to the brake drum in the same manner as described above.

While various changes may be made in the detail construction, it shall be understood that such changes shall be within the spirit and scope of the present invention as defined by the appended claims.

I claim:

1. In combination, a brake drum having an outboard web having a peripheral edge, said peripheral edge being formed with a first concave, quarter-circular half-groove extending around said edge, a pair of fixed circumferentially spaced fastening plates secured on the outboard side of said web and having radially outwardly extending end portions reaching radially across said first quarter-circular half-groove, said end portions being formed on their inboard sides with second quarter-circular half-grooves cooperating with said first half-groove to define semi-circular grooves facing in a radially outward direction, a wheel having a radially inwardly positioned annular flange, said flange being of semi-circular convex cross section and arranged to conformably seat in said semi-circular grooves, and a removable clamping plate positioned between said fixed clamping plates, said removable clamping plate being mounted on the outboard side of the drum web opposite said fixed clamping plates, said removable clamping plate having a radially outwardly extending end portion formed with a third concave, quarter-circular half-groove similar to said second half grooves and complementary to the half-groove in the periphery of the drum web, and means for releasably clamping said removable clamping plate in place with its half-groove retainably engaging the opposite side of the annular wheel flange from that engaged by said first half-groove in the peripheral edges of the drum web.

2. In combination, a brake drum having an outboard web having a peripheral edge, said peripheral edge being formed with a first concave, quarter-circular half-groove extending around said edge, a pair of fixed circumferentially spaced fastening plates secured on the outboard side of said web and having radially outwardly extending end portions reaching radially across said first quarter-circular half-groove, said end portions being formed on their inboard sides with second quarter circular half-grooves cooperating with said first half-groove to define semi-circular grooves facing in a radially outward direction, a wheel having a radially inwardly positioned annular flange, said flange being of semi-circular convex cross section and arranged to conformably seat in said semi-circular grooves, and a removable clamping plate positioned between said fixed clamping plates, said removable clamping plate being mounted on the outboard side of the drum web opposite said fixed clamping plates, said removable clamping plate having a radially outwardly extending end portion formed with a third concave, quarter-circular half-groove similar to said second half grooves and complementary to the half-groove in the periphery of the drum web, and means for releasably clamping said removable clamping plate in place with its half-groove retainably engaging the opposite side of the annular wheel flange from that engaged by said first half-groove in the peripheral edges of the drum web, said second and third half-grooves and the adjacent side of the wheel flange being formed with interengaging circumferentially extending serrations serving to prevent lateral displacement of the wheel disk flange relative to the fixed clamping plates and the web of the brake drum.

EDWARD E. RADFORD.

REFERENCES CITED

The following references are of record in the file of this patent:

UNITED STATES PATENTS

| Number | Name | Date |
| --- | --- | --- |
| 1,118,728 | Bloecher | Nov. 24, 1914 |
| 1,228,795 | McKay | June 5, 1917 |
| 1,403,141 | Worrall | Jan. 10, 1922 |
| 1,752,992 | Kranz | Apr. 1, 1930 |
| 1,837,694 | Walther | Dec. 22, 1931 |
| 1,979,598 | Ash | Nov. 6, 1934 |

FOREIGN PATENTS

| Number | Country | Date |
| --- | --- | --- |
| 115,574 | Sweden | Dec. 27, 1945 |